United States Patent [19]

Beutel

[11] 4,178,609

[45] Dec. 11, 1979

[54] COMB FILTER HAVING IMPROVED LUMINANCE RESPONSE

[75] Inventor: Robert C. Beutel, Fort Wayne, Ind.

[73] Assignee: The Magnavox Company, Ft. Wayne, Ind.

[21] Appl. No.: 845,002

[22] Filed: Oct. 25, 1977

[51] Int. Cl.² .......................................... H04N 9/535
[52] U.S. Cl. .................................................. 358/31
[58] Field of Search ............................. 358/31, 36, 37; 328/166

[56] References Cited

U.S. PATENT DOCUMENTS 3,836,707  9/1974  Murakami et al. ..................... 358/31
4,050,084  9/1977  Rossi ...................................... 358/31
4,072,984  2/1978  Kaiser .................................... 358/31

Primary Examiner—John C. Martin
Attorney, Agent, or Firm—Thomas A. Briody; William J. Streeter; George R. Pettit

[57] ABSTRACT

An improved filter is provided for separating two interleaved signals such as a television chroma and luminance signal. Means are provided for detecting when the chroma of a first line is uncorrelated with the chroma of a second line. The apparatus will respond to this detection so as to minimize the uncancelled chroma produced when a line of video signal is uncorrelated with the previous line of video information.

3 Claims, 4 Drawing Figures

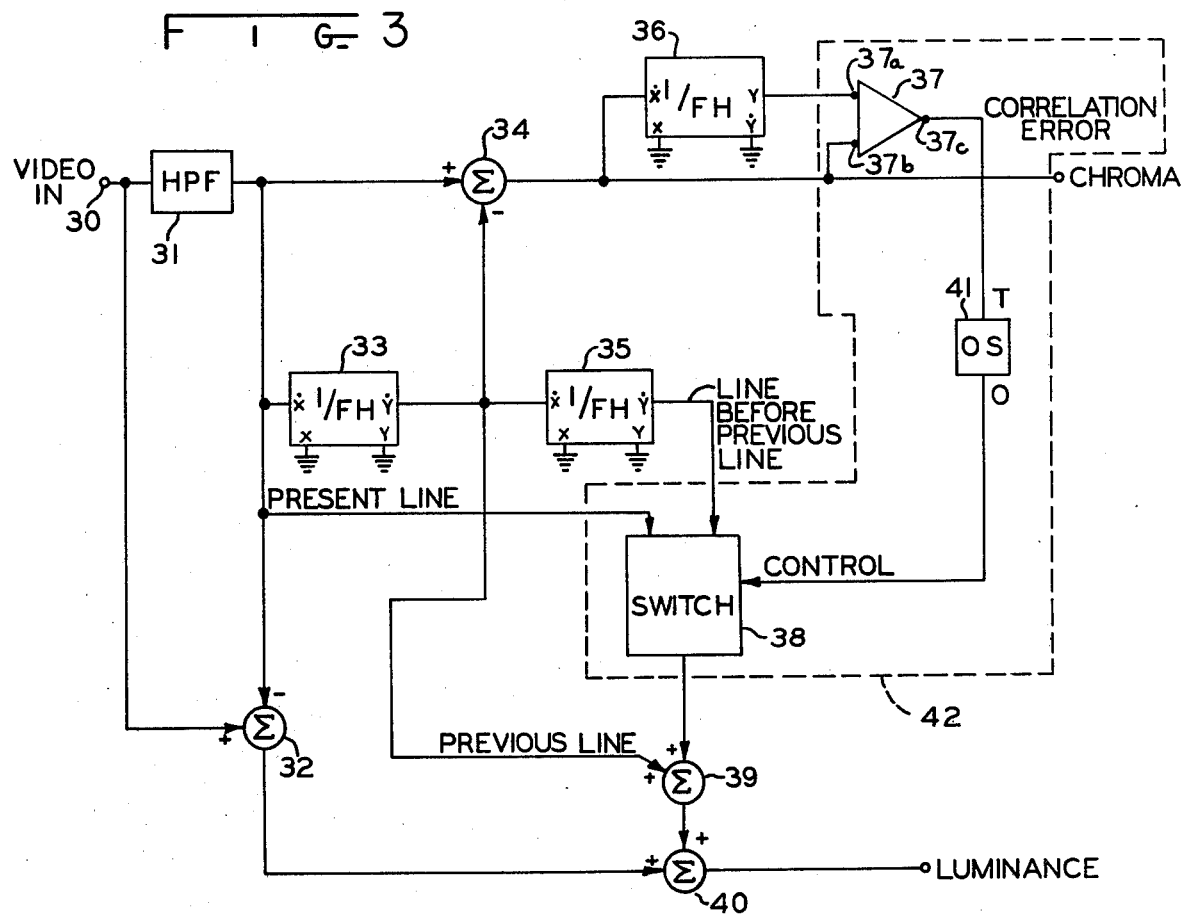
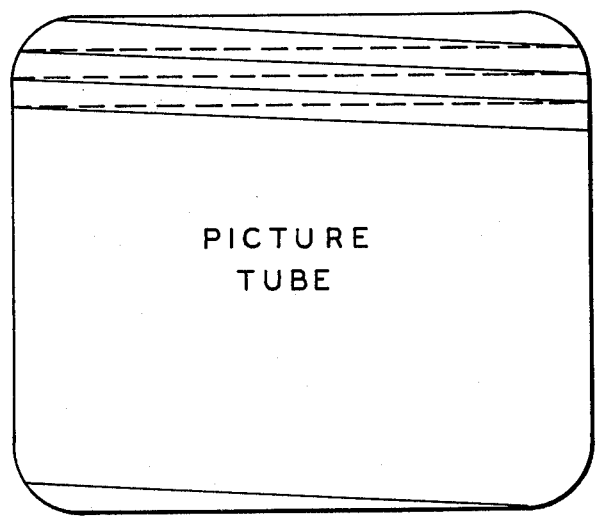

4,178,609

COMB FILTER HAVING IMPROVED LUMINANCE RESPONSE

BACKGROUND OF THE INVENTION

This invention relates to the comb filter art used in the television art. Specifically, a comb filter is provided which is relatively free of uncancelled signal components.

In the NTSC television system, video signals are developed which contain the necessary picture information for reconstruction of an image. The picture information is comprised of 525 consecutive raster lines. Each line has a chrominance and luminance signal associated therewith for identifying the color and brightness of the line. The lines which comprise the transmitted picture are produced at a frequency of $F_h$ which is typically 15.73426 kHz. The luminance and chrominance information therefore has a 15.73426 kHz repetition rate.

The frequency components of the luminance and chrominance signals are therefore centered at multiples of $F_h$. The chrominance information is frequency translated into a chroma signal by modulating a subcarrier having a frequency corresponding to an odd multiple of ½ the line frequency. In the NTSC broadcast system the subcarrier is at a frequency of 3.579545 mHz.

Once the frequency translation has occurred, the resulting chroma signal is combined with the luminance signal to form the composite video signal. The sidebands of the subcarrier containing the chrominance signal are interleaved with the luminance signal because of the prior frequency translation.

In a television receiver the chroma and luminance signals are separated by known means. One technique, referred to as comb filtering by those skilled in the art, delays the video signal by $1/F_h$ seconds. The delayed video signal is thereafter combined with an undelayed video signal. The delayed signal corresponds to the video signal of a previously scanned line and the undelayed signal corresponds to the video signal of a presently scanned line.

The chroma signal undergoes a phase reversal of 180° between consecutive lines due to the frequency translation. Therefore, by combining the video signal of a first scanned line with the video signal of a subsequently scanned line, the chroma components will be cancelled because of the 180° phase difference between consecutive lines of video signals leaving only a luminance signal.

The above technique works well where the chroma signal of a first line is correlated in both phase and amplitude with the chroma signal of a subsequent line. When the chroma signals of two succeeding lines are not so correlated, total cancellation does not occur and the luminance signal produced contains an objectionable interfering chroma signal. The uncorrelated chroma signals are produced when a transition in color occurs between successive lines. The different colors of the consecutive lines produce the uncorrelated chroma signals which results in incomplete cancellation.

SUMMARY OF THE INVENTION

It is a general object of this invention to provide an improved comb filter for removing frequency interleaved signals from one another.

It is a more specific object of this invention to provide a comb filter which reduces the amount of uncancelled signals which occur as a result of a signal transition.

These and other objects are accomplished by the apparatus of the present invention. In one embodiment of the present invention a standard NTSC video signal having a chroma signal interleaved with a luminance signal is presented to two delay lines connected in series. The first delay line provides a first delayed video signal representing a previously scanned line. The second delay line provides a second delayed signal which corresponds to the video signal of a line scanned prior to the last previously scanned line.

Switch means are provided for receiving the video signal of a presently scanned line and said second delayed signal.

The output of the switching means is applied to a combining circuit. When the video signal of a presently scanned line is correlated with the video signal of the previously scanned line, the switching means supplies the present line video signal to a combining means where it is combined with the video signal of the previously scanned line thereby realizing the standard comb filter configuration.

When a presently received video signal is not correlated with the video signal of the previous line scanned, the switching means supplies the second delayed signal to said combining means. The second delayed signal represents the video of a line scanned previous to the last line scanned. The second delayed signal is combined with the video signal representing the previously scanned line. The signal produced by the combining means is relatively free of chroma signal.

DESCRIPTION OF THE FIGURES

FIG. 1 illustrates the raster lines on a television receiver picture tube which generate the displayed image.

FIG. 3 is an illustration of a preferred embodiment of this invention.

DESCRIPTION OF THE PREFERRED EMBODIMENT

Referring now to FIG. 1, there is an illustration of a television receiver picture tube with horizontal raster lines numbering 1–4 across the face of the picture tube. A video signal is provided in the television receiver for indicating the brightness and color of each line. The video signal content changes every $1/F_h$ seconds corresponding to a new line being scanned. The brightness information is referred to as the luminance signal and color information is referred to as the chroma signal. The chroma signal changes phase 180° between successive lines. Therefore, by combining the video signals of two consecutive lines, the chroma signal is cancelled leaving only luminance signals.

This technique referred to as comb filtering is accomplished by delaying the video signal $1/F_h$ seconds and combining the delayed signal with an undelayed signal. Since the video signal represents a line being presently scanned, the delayed video signal represents a line previously scanned. Therefore, the addition of these two video signals will result in cancellation of the chroma signals contained in each signal.

The complete cancellation occurs when the color of two consecutive lines are correlated.

When a color transition occurs between for example lines 2 and 3, cancellation does not occur and uncancelled chroma signals are present in the combined signal. This uncancelled signal produces objectionable noise in the luminance signal.

The present invention reduces the effect of this problem by detecting when a present line is not correlated with a previous line. When the uncorrelated condition is detected between for example lines 2 and 3, the video signal of line 2 is combined with the video signal of line 1 rather than with the video signal of line 3. Since lines 1 and 2 are correlated, chroma signal cancellation occurs. When the next line 4 is scanned, its correlation with line 3 is checked. If correlation exists between lines 3 and 4, the corresponding video signals of these lines are combined to produce a luminance signal.

Figure 2:
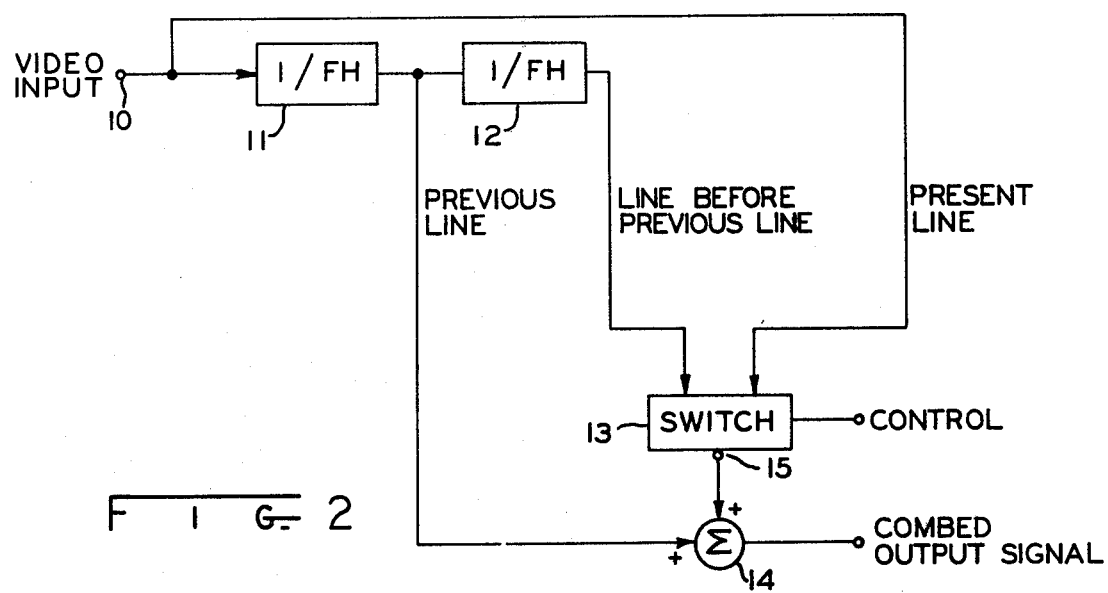
FIG. 2 is a block diagram representing a first embodiment of this invention.

Referring now to FIG. 2, terminal 10 receives a video signal containing an interleaved chroma and luminance signal. The chroma signal is contained in a known manner on a subcarrier having a frequency of substantially 3.58 megacycles. Every $1/F_h$ seconds a luminance and chroma signal is received by terminal 10 representing a scanned line. Each succeeding line of chroma signal is shifted in phase 180° from the previous line of chroma signal.

The video signal enters delay line 11 which causes it to be delayed by $1/F_h$ seconds. A second delay line 12 delays the signal an additional $1/F_h$ seconds providing a video signal delay of $2/F_h$ seconds. These delay lines may be of the type used in comb filters having a fixed delay of 63.555+0.005 microseconds. The delay lines may be acoustic or glass surface wave devices known to those skilled in the art. One such delay line is available from Amperex Corporation as type DL 45.

The delayed video signal supplied by delay line 11 represents the video signal of a previously scanned line. The output signal from delay line 12 comprises a video signal for a line previous to the line represented by the video signal supplied by delay line 11.

The output from delay line 12 is applied to an R. F. switch 13. The R. F. switch 13 is capable of selecting between the output of the second delay line 12 and a signal appearing at the input terminal 10. The R. F. switch output 15 is operatively connected to a summing network 14. The summing network 14 will combine a signal from the first delay line 11 in a known manner with the signal from R. F. switch 15. The R. F. switch 15 may be a balanced modulator such as a Motorola MC1596 or equivalent.

The apparatus of FIG. 2, when supplying the video signal of a presently scanned line to summing network 14, operates as a conventional comb filter having a maximum output at $F_h$ and a minimum output at frequencies of half multiples of $F_h$. These minimum points effectively cancel chroma signals appearing in the video signal yielding only a luminance signal.

It is known, however, that the cancellation of chroma in a comb filter requires correlation of information between first and a succeeding line of video signals. The 180° phase shift which occurs between lines insures cancellation only where amplitude and phase of the chroma signal remain constant between two consecutive lines. Since transitions in picture detail will alter the signal contents between succeeding lines, there will not be 100% cancellation and chroma signal will appear along with the luminance signal during these transitions.

The present invention solves this problem by detecting when the succeeding line has chroma information not the same as the preceding line. When such a condition of uncorrelation exists, a control signal may be applied to R. F. switch 13 which will cause the switch to supply the first delayed signal delayed $1/F_h$ seconds with the video signal which is delayed $2/F_h$ seconds. The signal produced by delay line 11 is the video signal produced by a line occuring prior to the present line video signal and therefore contains a chroma signal which is correlated with the chroma signal of a line occurring 2 lines prior to the present line. By combining these two video signals a signal having cancelled chroma is produced by summing network 14.

Circuitry which will effect automatic control of R. F. switch 13 is shown in FIG. 3. The control signal is generated by comparing a previous line of chroma signal with the present line of chroma signal. Referring now to FIG. 3, there is shown a preferred embodiment of the present invention which will provide a filtering to first and subsequent lines of video information. A video signal enters terminal 30 and is applied to a high-pass filter 31 and a summing junction 32. The high-pass filter 31 has a cut-off frequency selected so that a major portion of the higher frequency chroma signal occuring in the region of 3.58 megacycles is passed to a summing junction 34 and a first delay line 33. In one embodiment of this invention, a filter having a 3 db point of 2.3 mHz was selected. The output of high-pass filter 31 contains a minor portion of high frequency luminance signal as well as a major portion of the chroma signal contained in the video signal applied to terminal 30. The high frequency chroma is separated by combining the output of first delay line 33 with the output of high-pass filter 31 in a known manner. The high frequency chroma is thereafter applied to a delay line 36 having a fixed time delay of $1/F_h$ seconds. Comparator 37 compares the delayed output of delay line 36 to the output signal of summing network 34. This comparator circuit may be a standard differential comparator such as Motorola MC1711. Delay line 36 produces a video signal which represents the line previous to the video signal appearing at the second input of comparator 37. The delay line is equipped with an inverting output. The inverted output carries a delayed video signal in phase with the input chroma signal. By comparing the chroma signal from two consecutive lines, a correlation error signal may be produced. This error signal will be indicative of any changes in chroma from line to line. As was indicated with reference to FIG. 2, when two consecutive lines are not correlated a comb filter which removes chroma signal from luminance signals will produce uncancelled chroma along with the luminance signal. The use of this output from the comparator 37 may be used to switch the apparatus of FIG. 2 to prevent the combing of two uncorrelated consecutive lines.

The output signal of the comparator 37 is used to trigger a one shot 41. The one shot provides a pulse having a duration sufficient to enable the control input of R. F. switch 38 for at least one cycle of chroma signal which occurs at a rate of 3.58 mHz. That portion of FIG. 2 identified as 42 is described more completely in FIG. 4.

Figure 4:
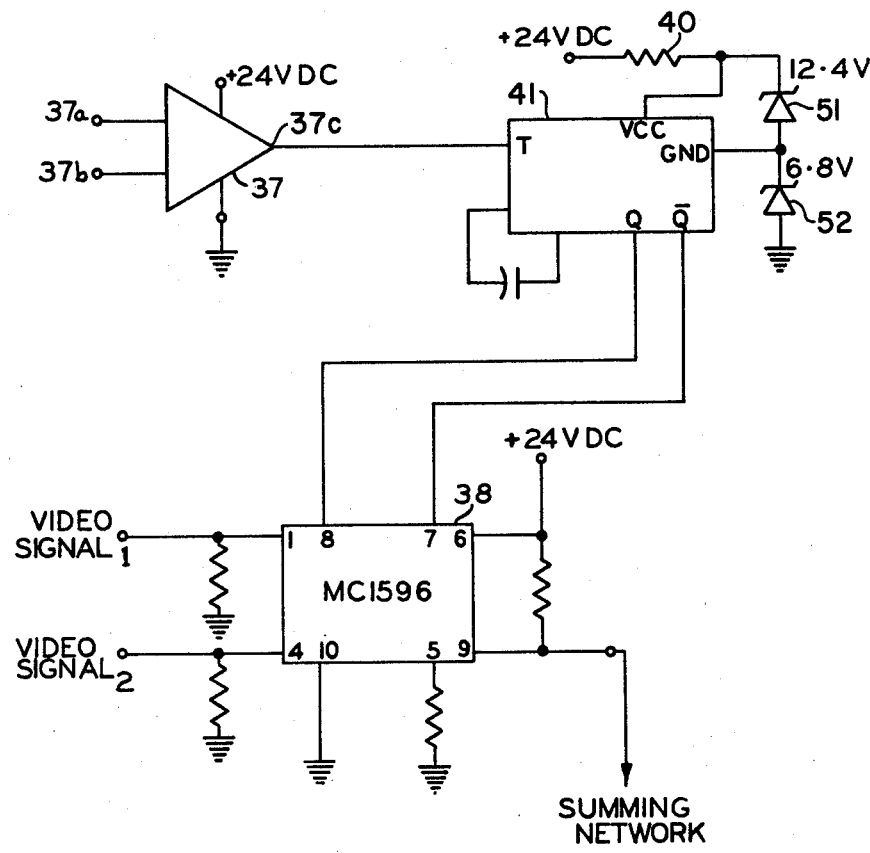
FIG. 4 illustrates specific circuitry for accomplishing section 42 of FIG. 2.

Referring now to FIG. 4, there is shown the specific apparatus for detecting correlation between successive lines of video information and for providing a control signal to the R. F. switch of FIG. 3.

The comparator 37 receives a chroma signal representing two consecutive lines of picture information at the inputs 37a and 37b. The comparator output is applied to the trigger input of a one shot 41. The one shot 41 is supplied with voltages derived from a bias string comprising resistor 40 and zener diodes 51 and 52. A potential of 12.4 volts d.c. is applied to the VCC input of the one shot and a potential of 6.8 volts is applied to the ground input. The one shot 41 outputs Q and $\overline{Q}$ are therefore at 12.4 volts d.c. or 6.8 volts d.c. The outputs Q and $\overline{Q}$ of one shot 41 are applied to the carrier signal inputs of R. F. switch 38. The output of R. F. switch 38 will supply one of the signals appearing on pins 1 and 4 to the summing network 39 of FIG. 2. The one shot duration is set to allow a complete cycle of chroma information to be transmitted through switch 38 before allowing the switch to return to a mode for transmitting the present line video signal to the summing network. A cycle of chroma information occurs in 1/3.58 MHz seconds.

Referring again to FIG. 3, the output signal from delay line 33 comprising a first delayed video signal is applied also to a second delay line 35. This delay line produces a signal delayed by $2/F_h$ seconds. The output from delay line 35, it will be recognized, corresponds to the video signal of a line two lines previous to the line represented by the present input video signal. The output of delay line 33 it will also be recognized is a video signal representing the line previous to the line represented by the video signal at the input of delay line 33.

R. F. switch 38 will supply either the video signal representing the most recent line scanned, or the video signal representing the line two lines previous to the most recent line scanned.

Summing junction 39 will add the signal provided by R. F. switch 38 with the video signal of the previously scanned line. Since R. F. switch 38 provides a video signal which is correlated with the video signal of the previously scanned line, cancellation of the chroma signal will occur. Summing junction 39 thereby provides a high frequency luminance signal relatively free of chroma signal.

Summing junction 32 subtracts the high-pass filter 31 output signal from the input video signal on terminal 30. This resulting difference signal is the lower frequency portion of the input video signal which comprises a major portion of the total luminance signal. This low frequency video signal is used for summation with the video signal presented by summing circuit 39. Summing circuit 39 will provide the luminance signal in the higher frequency portion of the video signal. The higher frequency luminance signal is added to the lower frequency video signal which is substantially all luminance signal, and the result is supplied as a luminance signal having increased band width.

Thus there has been described with respect to two embodiment means for filtering a composite video signal. The apparatus will provide high frequency chroma as well as a wide band luminance signal having a minimum of uncancelled chroma signal.

What is claimed is:

1. In a picture display system whereby an image is formed from a series of consecutive raster lines formed on a television picture tube, said lines having associated therewith a composite video signal for identifying the color and brightness of said lines whereby said color is represented by a chroma signal and said brightness is represented by a luminance signal, said luminance and chroma signals having an interleaved frequency spectrum, means for removing said luminance signal from said video signal comprising:
    a. means for supplying a first video signal representing a first raster line;
    b. means for supplying a second video signal representing a second raster line;
    c. means for supplying a third video signal representing a raster line produced previous to said first raster line; and
    d. means for selectively combining said second and third video signals with said first video signal, only said second video signal being combined with said first video signal when said first and second raster lines are correlated, and only said third video signal being combined with said first video signal in the absence of correlation between said first and second raster lines whereby a luminance signal is produced.

2. In a television display apparatus which displays a color image in the form of a series of consecutive raster lines, said lines having a video signal associated therewith comprising interleaved chroma and luminance signals, means for separating said luminance signal from said video signal comprising:
    a. filter means for dividing said video signal into a high frequency signal and a low frequency signal;
    b. a first delay means for delaying said high frequency signal $1/F_h$ seconds;
    c. a second delay means for delaying said high frequency signal $2/F_h$ seconds;
    d. means for detecting when the chroma signals of two consecutive raster lines are uncorrelated;
    e. means for combining a signal from said first delay means with a signal from said second delay means when two consecutive raster lines are uncorrelated whereby a high frequency luminance signal is generated; and
    f. means for combining said high frequency luminance signal with said low frequency signal whereby a broad band luminance signal is generated.

3. In a television receiver for displaying an image, said image comprising a series of consecutive raster lines, said raster lines having a video signal associated therewith, said video signal comprising a frequency interleaved chroma and luminance signal, means for removing said luminance signal comprising:
    a. means for delaying said video signal $1/F_h$ seconds to produce a first delayed signal;
    b. means for delaying said first delayed signal $1/F_h$ seconds to produce a second delayed signal;
    c. switching means for selectively supplying said second delayed signal and said video signal;
    d. combining means for combining a signal from said switching means with said first delayed signal to produce a luminance signal; and
    e. correlation detection means for determining when two consecutive lines are not correlated, said detection means being operatively connected to said switching means for supplying said video signal to said combining means when two consecutive lines are correlated and supplying said second delayed signal to said combining means when said consecutive lines are not correlated.

* * * * *